United States Patent [19]

Zambelli

[11] Patent Number: 4,732,458
[45] Date of Patent: Mar. 22, 1988

[54] GAS ZOOM LENS ASSEMBLY
[75] Inventor: Robert G. Zambelli, Rochester, N.Y.
[73] Assignee: Xerox Corporation, Stamford, Conn.
[21] Appl. No.: 902,736
[22] Filed: Sep. 2, 1986
[51] Int. Cl.[4] .............................. G02B 1/06; G02B 7/10
[52] U.S. Cl. ...................................... 350/419; 350/255
[58] Field of Search ........................ 350/419, 418, 255

[56] References Cited
U.S. PATENT DOCUMENTS

| | | | |
|---|---|---|---|
| 3,496,851 | 2/1970 | Himmelsbach | 350/419 X |
| 3,528,727 | 9/1970 | Halliday | 350/419 X |
| 4,331,388 | 5/1982 | McCrobie et al. | 350/419 |

Primary Examiner—John K. Corbin
Assistant Examiner—Scott J. Sugarman

[57] ABSTRACT

A multi-element lens is enabled by varying the pressure of a gas contained within a central cavity by a piston/cylinder arrangement. During magnification changes, the same mechanism used to change the lens position between an object and image plane is utilized to simultaneously vary the pressure within the lens cavity. The pressure change causes a change in the refractive index of the gas, thereby adjusting the focal length of the lens to the value required by the magnification change.

3 Claims, 3 Drawing Figures

GAS ZOOM LENS ASSEMBLY

BACKGROUND AND PRIOR ART

This invention relates to a multi-element zoom lens whose focal length is varied in response to a desired magnification change by varying the pressure of a gas enclosed between at least two of the lens elements and, more particularly, to an improved mechanism for varying the pressure simultaneously with lens movement.

As is known in the art, multi-element zoom lenses typically achieve a variation in focal length by mechanically varying the spacing between elements or groups of elements. U.S. Pat. Nos. 3,630,599 and 3,640,605 are representative of such lenses. These lenses require very precise movement of lens elements or lens groupings typically involving use of cams and related linkages. These demands result in relatively high cost.

A technique for varying focal length in a compound lens by varying gas pressure at the interlens media has been described by James D. Rees in an abstract entitled "Technique for Varying Focal Length of a Lens" published in Xerox Disclosure Journal, Vol. 1, No. 11/12, November/December 1976. U.S. Pat. No. 4,331,388 discloses a preferred lens construction using a preferred group of gases in an enclosed cavity between lens elements.

It is desirable, for gas zoom lens configurations, to vary the gas pressure by a simple, inexpensive mechanism. The present invention discloses a piston/cylinder controlled gas pressure system which correlates gas pressure changes with movements of the lens through magnification changes. More particularly, the invention relates to a gas zoom lens assembly for projecting an image of an object on an object plane onto an image plane at various magnifications comprising, in combination, a group of opposed, symmetrical lens elements defining at least a central cavity therebetween, said central cavity filled with a gas having a characteristic index of refraction, means for moving the lens towards and away from the image plane in response to magnification selections and means linked to said lens movement means to simultaneously vary the pressure of the gas within said cavity so as to change the focal length of the gas in response to changes in magnification ratio.

DESCRIPTION

Although the present invention has utility in a wide variety of applications, the following description is directed towwards its use as the imaging lens in a variable magnification copier.

Figure 1:
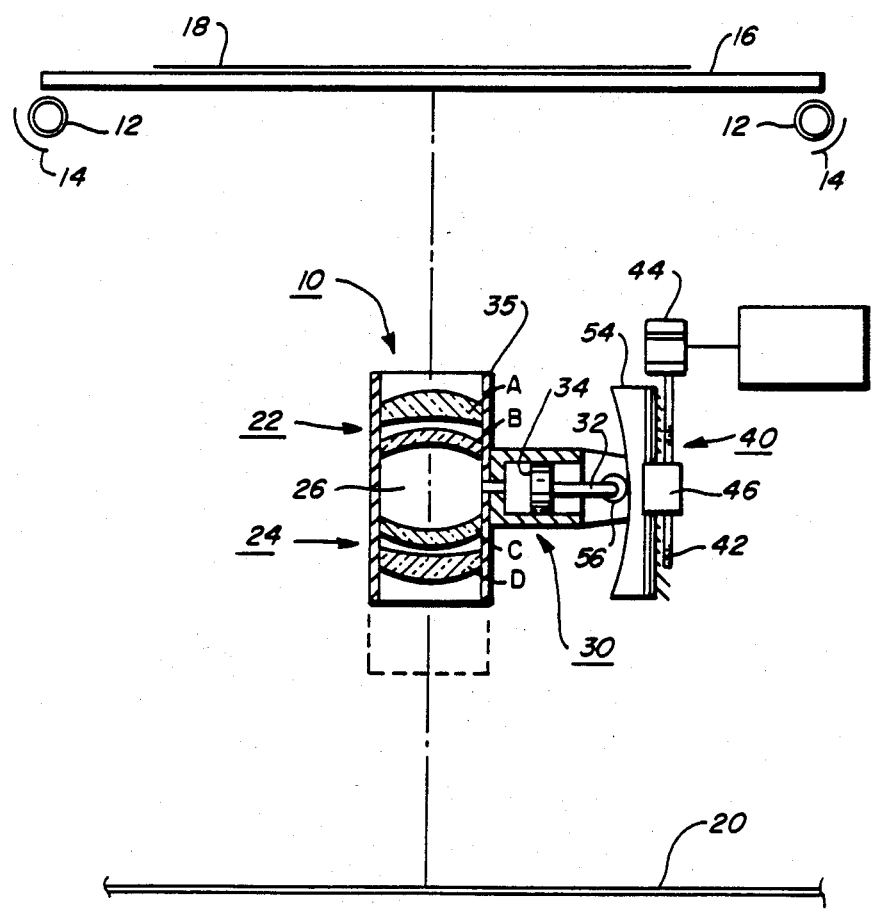
FIG. 1 is a side schematic view of the improved gas zoom lens assembly of the present invention in a multimagnification, full-frame photocopier.

In a copying environment when variable magnification is desired, a magnification range of $1.0 \pm 0.6$ is generally sufficient for most copying purposes. This relatively small magnification range necessitates a correspondingly limited range of lens focal length change. Focal length and magnification in an optical system are related by the following equation.

$$TC = (F + F/m) + (F + Fm) \text{(thin lens approximation)} \quad (1)$$

wherein:
TC = total conjugate
F = lens focal length
m = magnification
$(F + F/m)$ = object conjugate
$(F + Fm)$ = image conjugate The focal length of a compound lens is a function of several parameters, including the refractive index of the interlens media. The lens focal length can be changed by varying the refractive index of the medium between the lenses, (which is temperature and pressure dependent) in accordance with the following relationship:

$$n_{tp} - 1 = (n_o - 1)/(1 + at) + P/760 \text{(ideal gas approximation)} \quad (2)$$

wherein:
$n_{tp}$ = index of refraction of gas at given temperature and pressure
$n_o$ = index of refraction of gas at 0° C. and 760 mmHg
t = temperature in °C.
a = coefficient of thermal expansion of gas
p = pressure of gas in mmHg
P/760 = number of atmospheres pressure As is known in the art, changes in the index of refraction of an element or air space ($\Delta n$) can be correlated to a specific change in lens focal length ($\Delta f$). U.S. Pat. No. 4,331,388, whose contents are hereby incorporated by reference, disclosed preferred groups of heavy, high index gases at various pressures for specific lens design. FIG. 1 is a schematic representation of a gas zoom lens 10 in a full frame, variable magnification copier environment.

Lamps 12 and reflectors 14 illuminate the underside of platen 16 upon which a document 18, to be reproduced is placed. Lens 10, at the solid line position, is at unity magnification position and projects an image of document 18 onto image plane 20, which may be, for example, a belt-type photoreceptor.

Lens 10 comprises a first lens group element 22 (A, B) and a second lens element group 24 (C, D). Separating the negative meniscus elements B, C is a cavity 26 which is filled with a heavy high index gas. In a preferred embodiment the gas is chloropentafluoroethene (fluorocarbon 115). The parameters for lens 10 are, for descriptive purposes, the same as disclosed in Table 1 of U.S. Pat. No. 4,331,388.

Connected to the cavity 26 is a piston/cylinder assembly 30. Piston 32 is adapted to move up and down within cylinder 34 raising or lowering, respectively, the pressure of the gas within cavity 26.

Cylinder 34 is connected to lens housing 35. Assembly 30 is adapted to move in a vertical direction between the object plane 18 and image plane 20 by means of lens translation assembly 40. Assembly 40 comprises a lead screw 42 which is rotated by stepper motor 44 in response to an electrical input corresponding to a desired magnification change. Connected to lead screw 42, and adapted to advance along the surface during rotation is slide member 46. Slide member 46 has a first vertical component 48 attached to lens housing 35 and cylinder 34 and a second segment 50 having a recess 52 therethrough to accommodate a fixed cam/rail member 54. Cam follower 56 is attached to the end of piston 32 and is adapted to ride along the surface of cam/rail member 54.

In operation, and assuming that a change in magnification from 1X to 0.64X is required, the lens 10 is required to be moved to the dotted position shown. Upon selection of the desired magnification value, typically by an operator making a selection at a control panel, an electronic signal is sent to motor 44 which in turn causes lead screw 42 to rotate for the period of time associated with the input signal. As the lead screw rotates, slide 46 advances along the screw axis in the indicated direction towards image plane 20, carrying lens 10 and assembly 30 therewith. As the movement proceeds, cam follower 56 rides up the cam surface exerting an upward force on piston 32, thereby increasing the pressure and hence the index of refraction of the gas within cavity 26.

The shape of the cam surface is correlated to the magnification values selected; hence, the change in gas pressure is calibrated to the change in focal length required for the new magnification position.

For most magnification systems, a pressure change of from 0.65X to 1.5X is sufficient. If 1X mag requires a pressure of 15 psin ($P_o$) within cavity 26, then a 95 psin pressure ($P_F$) is used for a 0.65/1.5 magnification. Therefore a total pressure change range of 80 psin is required. The required stroke $S_1$ for piston 32 can be determined, for the particular example, with reference to FIG. 2. Assume the volume of cavity 26 is 0.5 in$^3$ ($V_L$) and the area of the piston ($A_p$)=1 in$^2$; for initial conditions, $P_1 = 15$ psi and $$V_{TI} = V_L + V_I \text{ where } V_I = 3 \text{ in}^3$$

for final conditions, $$P_F = 95 \text{ psi and } V_{TF} = V_L + V_F$$

since $$P_I V_{TI} = P_F V_{TF} \text{ and } V_F = V_I - SA$$

$$P_I(V_L + V_I) = P_F(V_L + V_F)$$

$$P_I(V_L + V_I) = P_F(V_L + V_I - SA)$$

$$\frac{P_I}{P_F}(V_L + V_I) - V_L + V_I = -SA)$$

$$S = \left[ V_L + V_I - \frac{P_I}{P_F}(V_L + V_I) \right] / A$$

$$S = \left[ .5 + 3 - \frac{15}{95}(.5 + 3) \right] / 1 = 2.95^{11}$$

Figure 2:
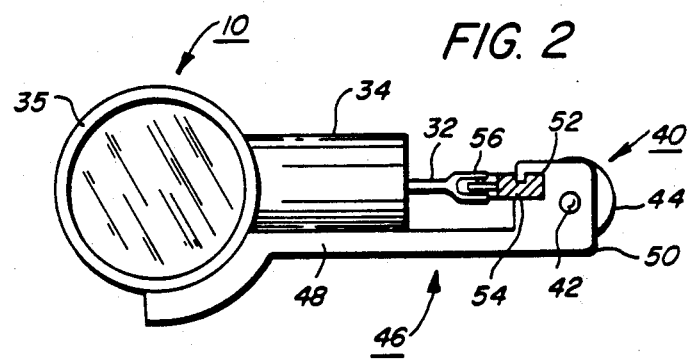
FIG. 2 is a top view of the lens translation assembly of FIG. 1.
Figure 3:
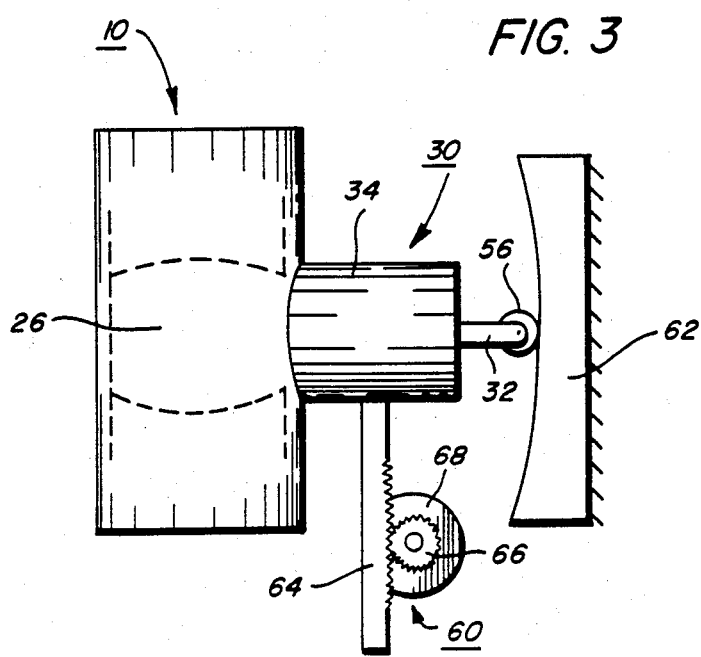
FIG. 3 is an alternate embodiment of the lens translation assembly of FIG. 2.

FIG. 3 illustrates a second embodiment of the lens translation assembly 40 of FIGS. 1 and 2. As shown, lens translation assembly 60 comprises a stationary cam member 62. A rack and pinion assembly 64 comprises rack 64 connected to cylinder 34, and pinion 66 driven by a motor 68. For this embodiment, magnification signals to the pinion motor 68 rotate the pinion and cause the rack, and hence the piston/cylinder assembly 30 and lens 10 to move between the object and image planes. Cam follower 56 rides upwards along the surface of cam 62, in either enlargement or reduction, driving piston 32 upwards on the document and increasing or decreasing the pressure of the gas, respectively, within chamber 26.

While the invention has been described with reference to the structure disclosed, it is not confined to the details set forth, but is intended to cover such modifications or changes as may come within the scope of the following claims:

What is claimed is:

1. A gas zoom lens assembly for projecting an image of an object on an object plane onto an image plane at various magnifications comprising, in combination, a group of opposed, symmetrical lens elements defining at least a central cavity therebetween, said central cavity filled with a gas having a characteristic index of refraction, means for moving the lens towards and away from the image plane in response to a magnification selection, a piston/cylinder assembly (and means) linked to said lens movement means to simultaneously vary the pressure of the gas within said cavity so as to change the focal length of the gas in response to changes in magnification ratio (.) and a cam surface extending between said object and image planes and a cam follower attached to said piston, said piston movement within said cylinder governed by the cam motion between the cam follower and the cam surface.

2. The gas zoom lens assembly of claim 1 wherein said lens moving means comprises a lead screw assembly moved in response to magnification change signals, the movement of said lead screw being transferred to said lens assembly and to said piston.

3. The gas zoom lens assembly of claim 1 wherein said lens moving means comprises a rack and pinion assembly movable in response to magnification change signals, the movement of said rack and pinion being transferred to said lens assembly and to said piston.

* * * * *